(12) United States Patent
Noble

(10) Patent No.: US 8,798,457 B2
(45) Date of Patent: Aug. 5, 2014

(54) PROTOCOLS FOR OUT-OF-BAND COMMUNICATION

(75) Inventor: Gayle L. Noble, Boulder Creek, CA (US)

(73) Assignee: Finisar Corporation, Sunnyvale, CA (US)

( * ) Notice: Subject to any disclaimer, the term of this patent is extended or adjusted under 35 U.S.C. 154(b) by 136 days.

(21) Appl. No.: 13/356,403

(22) Filed: Jan. 23, 2012

(65) Prior Publication Data

US 2012/0120851 A1 May 17, 2012

Related U.S. Application Data

(60) Division of application No. 12/198,631, filed on Aug. 26, 2008, now Pat. No. 8,107,822, which is a continuation-in-part of application No. 11/134,786, filed on May 20, 2005, now abandoned, and a continuation-in-part of application No. 11/204,920, filed on Aug. 15, 2005, now abandoned, and a continuation-in-part of application No. 11/344,883, filed on Feb. 1, 2006, now abandoned, and a continuation-in-part of application No. 11/348,745, filed on Feb. 7, 2006, now abandoned, and a continuation-in-part of application No. 11/279,360, filed on Apr. 11, 2006, now abandoned, and a continuation-in-part of application No. 11/413,829, filed on Apr. 28, 2006, now Pat. No. 7,899,057, and a continuation-in-part of application No. 11/537,602, filed on Sep. 29, 2006, now abandoned, and a continuation-in-part of application No. 11/537,590, filed on Sep. 29, 2006, now abandoned, and a continuation-in-part of application No. 11/537,599, filed on Sep. 29, 2006, now abandoned, and a continuation-in-part of application No. 11/537,595, filed on Sep. 29, 2006, now abandoned, and a continuation-in-part of application No. 11/685,548, filed on Mar. 13, 2007, now abandoned, and a continuation-in-part of application No. 11/685,551, filed on Mar. 13, 2007, now abandoned, and a continuation-in-part of application No. 11/744,591, filed on May 4, 2007, now abandoned.

(51) Int. Cl.
*H04B 10/073* (2013.01)

(52) U.S. Cl.
USPC .......................................................... 398/16

(58) Field of Classification Search
CPC .... H04L 45/02; H04L 41/12; H04B 17/0085; H04B 7/022
USPC .................................................. 398/16, 58, 32
See application file for complete search history.

(56) References Cited

U.S. PATENT DOCUMENTS

| 4,530,088 A * | 7/1985 | Hamstra et al. ............... 370/522 |
| 6,292,838 B1 * | 9/2001 | Nelson .......................... 709/236 |
| 2005/0232643 A1 * | 10/2005 | Aronson et al. .............. 398/183 |

* cited by examiner

*Primary Examiner* — Shi K Li
(74) *Attorney, Agent, or Firm* — Maschoff Brennan

(57) ABSTRACT

Methods for managing an optical network through out-of-band communication between optical transceiver modules in a heterogeneous network fabric are disclosed. The disclosed methods include methods for performing fabric discovery, communicating error messages, detecting intrusion. Methods are also disclosed for communicating between transceivers of differing protocol versions and memory capacity.

19 Claims, 9 Drawing Sheets

PROTOCOLS FOR OUT-OF-BAND COMMUNICATION

CROSS-REFERENCE TO RELATED APPLICATIONS

This application is a divisional of U.S. patent application Ser. No. 12/198,631 filed Aug. 26, 2008, which is a continuation-in-part of U.S. patent application Ser. No. 11/744,591 filed May 4, 2007; which is a continuation-in-part of U.S. patent application Ser. No. 11/685,551 filed Mar. 13, 2007; which is a continuation-in-part of U.S. patent application Ser. No. 11/685,548 filed Mar. 13, 2007; which is a continuation-in-part of U.S. patent application Ser. No. 11/537,590 filed Sep. 29, 2006; which is a continuation-in-part of U.S. patent application Ser. No. 11/537,602 filed Sep. 29, 2006; which is a continuation-in-part of U.S. patent application Ser. No. 11/537,599 filed Sep. 29, 2006; which is a continuation-in-part of U.S. patent application Ser. No. 11/537,595 filed Sep. 29, 2006; which is a continuation-in-part of U.S. patent application Ser. No. 11/413,829 filed Apr. 28, 2006 (now U.S. Pat. No. 7,899,057); which is a continuation-in-part of U.S. patent application Ser. No. 11/279,360 filed Apr. 11, 2006; which is a continuation-in-part of U.S. patent application Ser. No. 11/348,745 filed Feb. 7, 2006; which is a continuation-in-part of U.S. patent application Ser. No. 11/344,883 filed Feb. 1, 2006; which is a continuation-in-part of U.S. patent application Ser. No. 11/204,920 filed Aug. 15, 2005; which is a continuation-in-part of U.S. patent application Ser. No. 11/134,786 filed May 20, 2005. Each of the foregoing is hereby incorporated by reference.

BACKGROUND OF THE INVENTION

1. The Field of the Invention

The present invention relates to systems and methods for out-of-band communication across optical transceiver modules of a network fabric.

2. The Relevant Technology

In modern networks, network devices such as switches, routers, host bus adapters (HBA), servers, and the like, are coupled to one another by means of fiber optic transceivers. Many transceivers are "active," meaning that they have memory and processing capabilities. U.S. patent application Ser. No. 11/070,757, filed Mar. 2, 2005, which is hereby incorporated by reference, discloses systems and methods by which transceiver modules communicate with one another independently of the network device from which they receive data. The '757 application discloses a system wherein an optical transceiver module modulates the peak or average power of a transmitted signal at a low frequency in order to transmit module specific data out of the frequency band carrying the network data transmitted by the module. A receiving module demodulates the out-of-band data by tracking modulation of the peak or average power of the received signal.

In a typical network, components are not all updated or replaced simultaneously. Both new and old components must therefore be able to communicate with one another even though older components may not be updated. Some transceivers have firmware that may be reprogrammed to facilitate communication with newer modules. However, it is not convenient to update each transceiver in a network each time a newer module is installed. Furthermore, older transceivers have physical limitations, such as a smaller memory, lower processing speed, and less sophisticated optics that cannot be readily updated.

In view of the foregoing, it would be an advancement in the art to provide systems and methods for enabling out-of-band communication across a heterogeneous fiber optic network including transceiver modules of differing capabilities.

BRIEF SUMMARY OF THE INVENTION

In one aspect of the invention, communication between transceiver modules having a memory defining a number of tables each having a size and offset address includes determining a table and offset address for requested data according to a table size of an originating module. A system address corresponding to the table and offset address is generated and a read command having a command type indicating a system address size, the system address, a length of the requested data, and a contingency field storing the table size of the originating module is transmitted to a receiving module. The receiving module regenerates the table and offset address from the system address and the table size stored in the contingency field. If the table size stored in the contingency field is the same as a table size of the receiving module, then data having the length of the requested data stored at an address corresponding to the table and offset address is transmitting to the receiving module. If the table size stored in the contingency field is not the same as the table size of the receiving module, data having a length different from the requested length from a table of the receiving module having a table number corresponding to the regenerated table and offset address is transmitted.

In another aspect of the invention, the receiving module evaluates whether it has sufficient memory to return data having the length of requested data beginning at the regenerated table and offset address, and, if not, evaluating an extended contingency field. If the extended contingency field does not contain an instruction not to truncate, the receiving module transmits to the originating module data beginning at the regenerated table and offset address having a length less than the length of requested data.

In another aspect of the invention, communication between the originating and receiving modules occurs in an out-of-band optical channel.

In another aspect of the invention a method for discovering a network fabric includes transmitting a first knock knock command from the transmit port of a first transceiver module of a plurality of transceiver modules having receive ports and transmit ports. If a response to the first knock knock command is received at the receive port of the first transceiver module, then the first transceiver records an indicator that it is in a point-to-point network. If a response to the first knock knock command is not received at the receive port of the first transceiver module, then it sends a second knock knock command containing an instruction to forward the second knock knock command N times, where N is greater than 1. If a response to the second knock knock command is received at the receive port of the first transceiver module, then the first transceiver module an indicator that it is in a ring network having N layers.

If a response to the second knock knock command is not received at the receive port of the first transceiver module, then it sends a plurality of subsequent knock knock commands each containing an instruction to forward, wherein each subsequent knock knock command instructs a receiving transceiver module to forward the subsequent knock knock command M times, where M is the number of times the previous knock knock command of the subsequent knock knock commands instructs the receiving transceiver module to forward the subsequent knock knock command plus an increment value. If a response to one of the subsequent knock knock commands is received, then the first transceiver module records an indicator that the first transceiver module is in a ring network having M layers. If a response to one of the subsequent knock knock commands having a value of M greater than a maximum value is not received, then the first transceiver module records an indicator that the first transceiver module is not in a ring or point-to-point network.

These and other objects and features of the present invention will become more fully apparent from the following description and appended claims, or may be learned by the practice of the invention as set forth hereinafter.

BRIEF DESCRIPTION OF THE DRAWINGS

To further clarify the above and other advantages and features of the present invention, a more particular description of the invention will be rendered by reference to specific embodiments thereof which are illustrated in the appended drawings. It is appreciated that these drawings depict only typical embodiments of the invention and are therefore not to be considered limiting of its scope. The invention will be described and explained with additional specificity and detail through the use of the accompanying drawings in which.

DETAILED DESCRIPTION OF THE PREFERRED EMBODIMENTS

Figure 1:
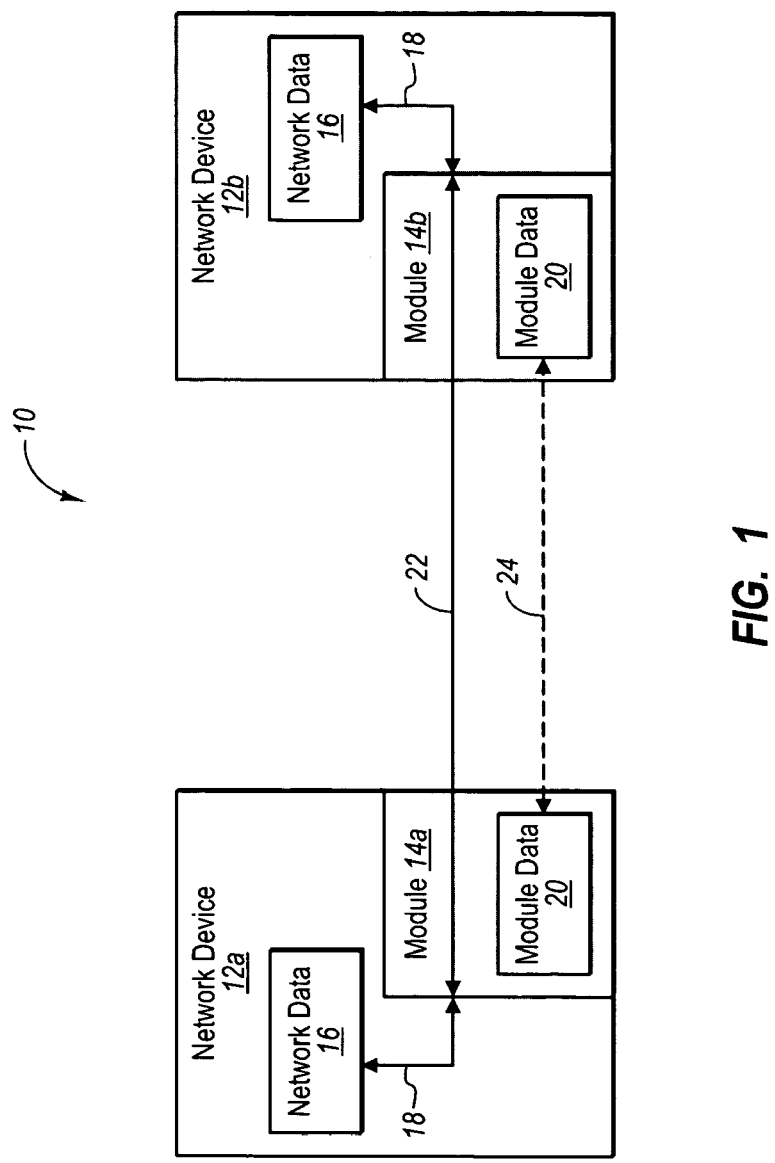
FIG. 1 illustrates a schematic block diagram of in-band and out-of-band links transceiver modules hosted by network devices in accordance with an embodiment of the present.

Referring to FIG. 1, a network 10 includes a number of network devices 12a, 12b. The network devices may be embodied as workstations, servers, switches, routers, host bus adapters, or the like. Transceiver modules 14a, 14b are coupled to each network device 12a, 12b and received network data 16 by means of a data channel 18. In the illustrated embodiment, the transceiver modules 14a, 14b are optical transceivers including a transmitter optical subassembly (TOSA) and a receiver optical subassembly (ROSA). The transceiver modules 14a, 14b may conform to any industry standard form factor such as SFP, XFP, X2, XPAK, or XEN-PAK.

The transceiver modules 14a, 14b store module data 20 that includes diagnostic and operational data that is used by the modules 14a, 14b to control parameters governing the transmission of data over an optical fiber, such as output power, carrier frequency, bit period, duty cycle, rise time, fall time and the like. Module data 20 may include data relating to receiving of data over an optical fiber such as eye profile, eye mask parameters, threshold, sensitivity, and the like. The module data 20 may include diagnostic data regarding itself and another module 14a, 14b to which it is connected. Such data may include the received power, recovered clock frequency, bit error rate, or the like, of a received signal. The diagnostic data may include self diagnostic data such as the results of self-tests of a module component such as a laser.

The modules 14a, 14b are coupled to one another by a data channel 22 and an out-of-band (OOB) channel 24. In a preferred embodiment, the data channel 22 and OOB channel 24 include the same physical medium, such as an optical fiber. For example, the data channel 22 may include high frequency modulation of an optical signal transmitted over an optical fiber whereas the OOB channel 24 includes low frequency modulation of the power envelope of the same optical signal, such as is disclosed in U.S. patent application Ser. No. 11/070,757, which is incorporated herein by reference. In other embodiments, the data channel 22 includes optical signals transmitted over an optical fiber or wire whereas the OOB channel 24 includes a radio frequency (RF) channel.

The network data 16 is transmitted over the data channel 22 by the transceiver modules 14a, 14b. Diagnostic and configuration data included in the module data 20 are communicated to other transceiver modules 14a, 14b in the OOB channel 24. However, in some embodiments, both diagnostic and configuration and network data are transmitted over the same data channel 22. For purposes of this disclosure all communication over an OOB channel 24 may also take place over the in-band data channel 22. OOB channel 24 may also carry instructions from a transceiver 14a to a transceiver 14b. For example, U.S. application Ser. No. 11/966,646 discloses a test transceiver that communicates with a corrective transceiver to generate network errors for diagnostic purposes. Communication between the test transceiver and corrective transceiver in the above referenced application may occur in the OOB channel 24. For example, the test transceiver may instruct the corrective transceiver not to correct for errors that the test transceiver introduces into the data channel 22. In other applications a transceiver 14a may instruct a transceiver 14b by means of the OOB channel 24 to encrypt data in the data channel 22.

Examples of systems that may use an OOB channel 24 to transmit diagnostic and configuration information include those disclosed in U.S. patent application Ser. No. 11/134,786 filed May 20, 2005; U.S. patent application Ser. No. 11/204,920 filed Aug. 15, 2005; U.S. patent application Ser. No. 11/344,883 filed Feb. 3, 2006; U.S. patent application Ser. No. 11/348,745 filed Feb. 7, 2006; U.S. patent application Ser. No. 11/279,360 filed Apr. 11, 2006; U.S. patent application Ser. No. 11/413,829 filed Apr. 28, 2006; U.S. patent application Ser. No. 11/537,602 filed Sep. 29, 2006; U.S. patent application Ser. No. 11/537,590 filed Sep. 29, 2006; U.S. patent application Ser. No. 11/537,599 filed Sep. 29, 2006; U.S. patent application Ser. No. 11/537,595 filed Sep. 29, 2006; U.S. patent application Ser. No. 11/685,548 filed Mar. 13, 2007; U.S. patent application Ser. No. 11/685,551 filed Mar. 13, 2007; and U.S. patent application Ser. No. 11/744,591 filed May 4, 2007.

Figure 2:
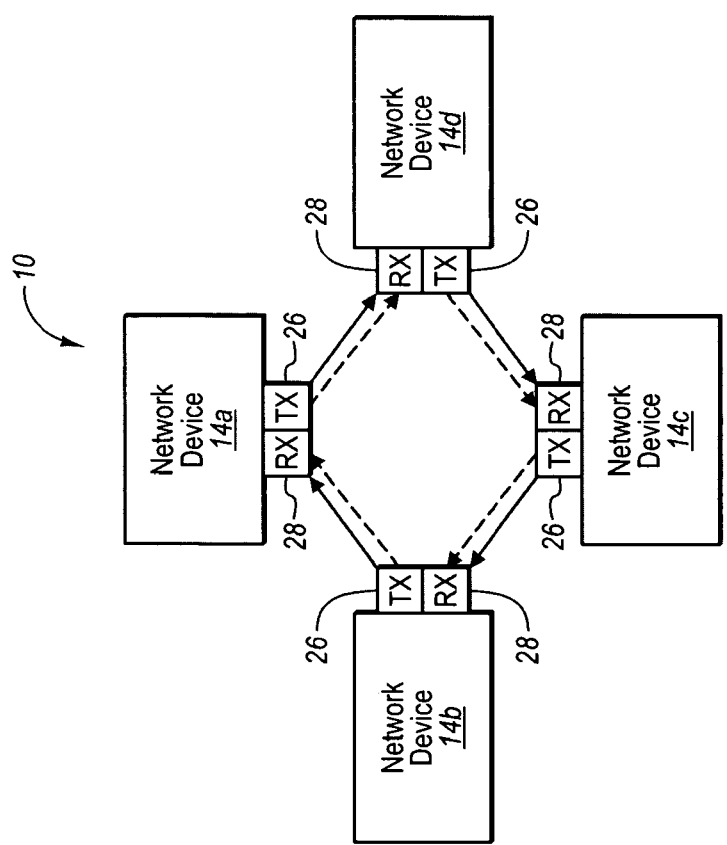
FIG. 2 is a schematic block diagram of a ring network.

Referring to FIG. 2, the network 10 may have a "ring" configuration, in which the transmit port 26 of a transceiver module 14a, for example, is coupled to the receive port 28 of a transceiver module 14d and the receive port 28 of the transceiver module 14a is coupled to the transmit port 26 of a transceiver module 14b. In this manner, data must be circulated through a number of intervening transceiver modules 14a-14d before reaching a destination module 14a-14d. For example, in order to transmit data from transceiver module 14a to transceiver module 14b, the data must be transmitted through modules 14d and 14c.

Figure 3:
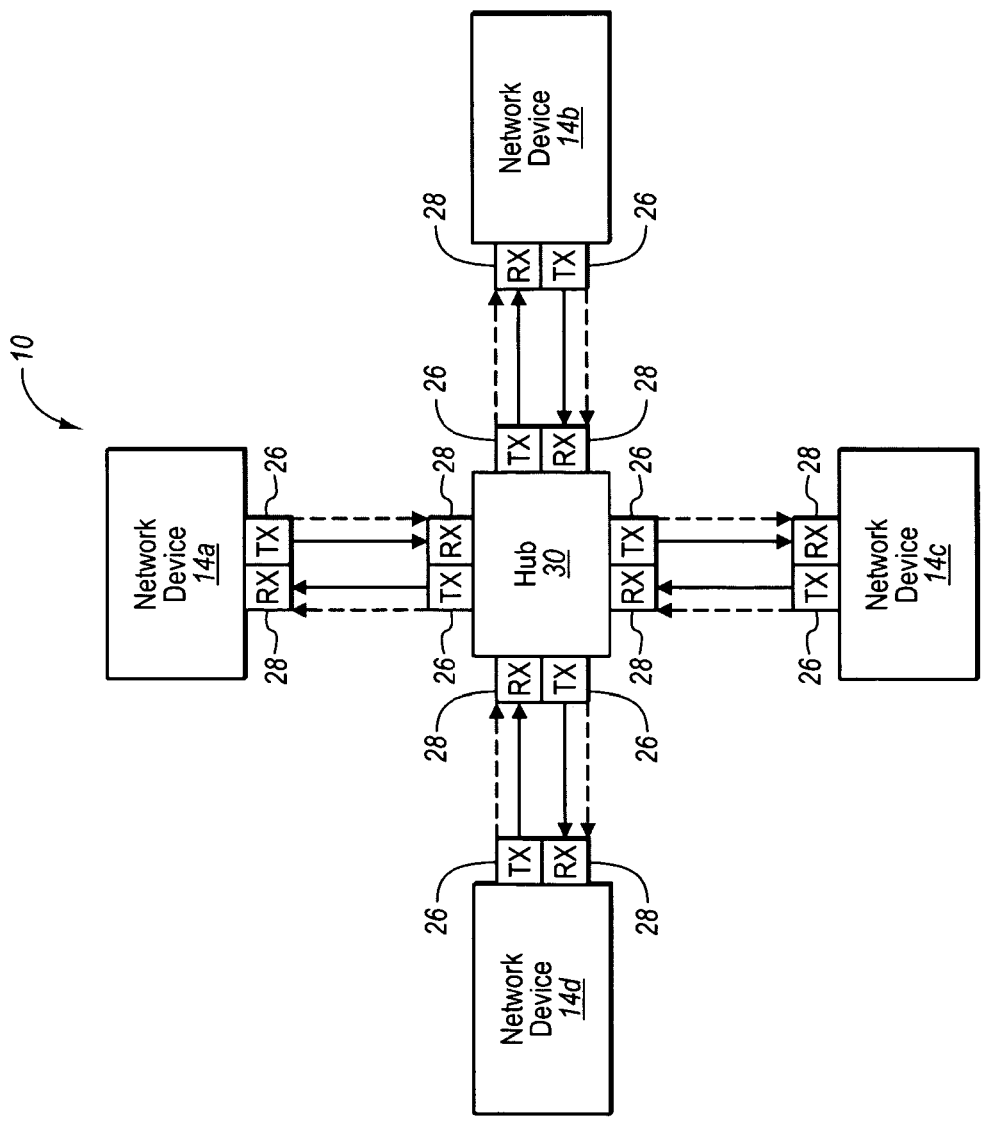
FIG. 3 is a schematic block diagram of a star network.

Referring to FIG. 3, in some embodiments, the network 10 may have a "star" configuration, in which both the transmit port 26 and receive port 28 of each transceiver 14a-14d is coupled to a corresponding transmit port 26 and receive port 28 of a hub 30. The hub 30 routes signals to the receive port 26 of the destination network device 14a-14d. In this manner, data needs to travel through at most one other device before reaching a destination device 14a-14d.

Figure 4:
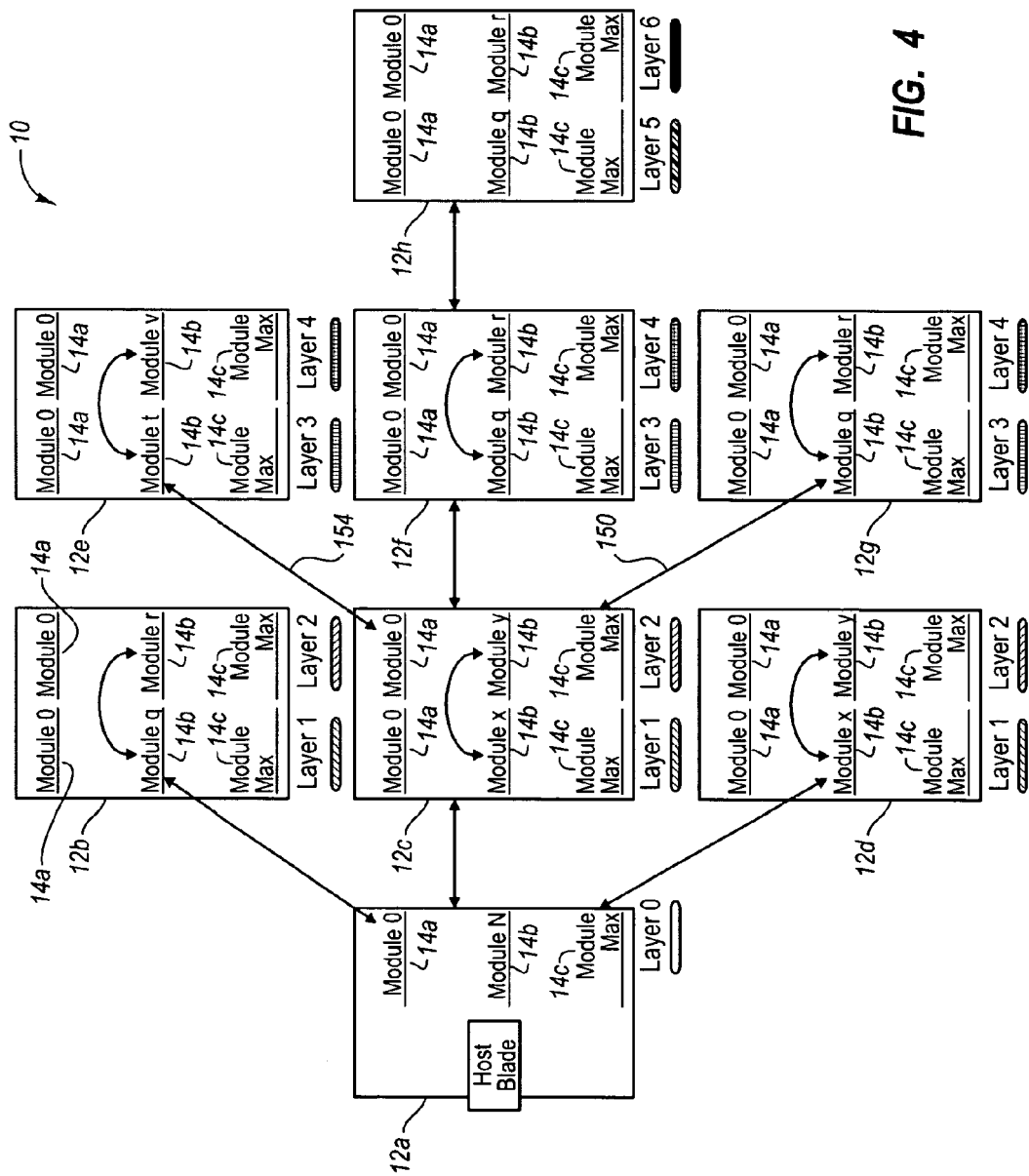
FIG. 4 is a schematic block diagram of a network fabric.

Referring to FIG. 4, in some embodiments, a network 10 is arranged in layers in which a network device 12a of layer 0 includes a plurality of modules 14a-14c each coupled to modules 14a-14c of network devices 12b-12c in layer 1. The network devices 12b-12c further include modules 14a-14c that are part of layer 2 coupled to modules 14a-14c of network devices 12d-12f defining a layer 3, and so on. It is readily apparent that some network devices include modules 14a-14c belonging to two different layers. The network devices 12a-12c may control routing of data through the network. For example, the network devices 12a-12h may be embodied as routers or switches for directing network traffic.

In some embodiments, modules 14a-14c in a first layer are able to communicate with modules 14a-14c of a second layer that are coupled to the same network device 12a-12f by means of a host bridge 32. The host bridge transfers module data 20 from one module 14a-14c to another, in the same or a different layer, that are coupled to the same network device 12a-12f. In some embodiments, a module 14a-14c may set a bit in data output to the network device 12a-12f to which it is coupled indicating that it has module data 20 to transmit to another module 14a-14c. The network 12a-12f may then read the module data 20 and transfer it to another module 14a-14c coupled thereto. The network device 12a-12f may transfer the data by setting a bit in data provided to the destination module 14a-14c indicating that module data 24 is available to be input to the destination module 14a-14c. The destination module 14a-14c may then store data received as module data 20, rather than transmitting it over the data channel 18.

Communications between modules 14a-14c included in any of the foregoing, and other, network configurations may follow a protocol accommodating different capacities of modules 14a-14c. Communications may include packets of data having fields described in Table 1, below.

TABLE 1

Data Packet Field Definitions

| Field | Bits | Description |
| --- | --- | --- |
| Preamble | 8 | To inform other device that something will be sent |
| Lock | 3 | To allow other device to lock on start of sequence |
| Communication Type (CT) | 8 | 0x01 = Knock Knock<br>0x02 = Acknowledge<br>0x03 = Command/system address = 16 bits<br>0x04 = Response 16 bits<br>0x05 = Communication Corrupted<br>0x06 = Communications stopped<br>0x07 = Command/system address = 32 bits<br>[0x08-0x0F = cross fabric communications for ring or star networks]<br>0x051 = Mass Error Alert (See Figure 7) |
| Communication ID (C-ID | 8 | Originator creates this starting as a random number. Respondent returns this same number. Originator increments number for each next communication it originates |

TABLE 1-continued

Data Packet Field Definitions

| Field | Bits | Description |
| --- | --- | --- |
| Sync | 8 | Alternate bits (01010101) to verify that no bits have been dropped such that data is now in the wrong place |
| Command ID (CMD) | 8 | See Table 2 |
| System Address | Depends on CT | CT = 0x03 - - - 16bits<br>CT = 0x07 - - - 32 bites |
| Length | Depends on CT | CT = 0x00 - - - 0x10<br>CT = 0x0A through 0x FF - - - Not yet defined |
| Data Bytes | Depends on Length | |
| Sync | 8 | Alternate bits to verify that no bits have been dropped such that data is now in the wrong place (01010101) |
| Status/Contingency | 16 | Status of response 0x0000 - OK<br>Other Values - error type |
| Extended Status/Contingency | 16 | Extended status of response.<br>Meaning of value depends on Status (error messages, version information, contingency instructions,) |
| Wrapper Count (WC)/Layer | 16 | Wrapper = Number of Communication IDs included in wrapper when communicating across a network fabric<br>Layers = a layer count incremented for each layer across which the data packet is transmitted. May be negative depending on the location of module originating a data packet in relation to the module that initiated communication. |
| Wrappers/Layers | (depends on WC) | Wrappers = Communication IDs are placed in this field as a data packet is passed along the fabric, creating a trail describing the network.<br>Layer = depends on layer of originating module. The layer field does not change as the data packet is forward along the fabric. Layer may be negative where the module originating the message has a lower layer number than the module that initiated communication. |
| Communication Complete | 3 | Signals communication is over |

The Preamble field contains a sequence of bits that communicate to a receiving transceiver that a data packet is being sent. The Preamble field may be any sequence of bits that serves this function. The Lock field includes a sequence of bits enabling a receiving transceiver to lock onto the start of the sequence. The Lock field may enable the receiving transceiver to recognize the starting bit of the data packet. The Lock field may also enable a clock data recovery (CDR) circuit to generate a clock signal synchronous with bit transitions within data packet.

Sync Fields are provided at one, two, or more positions within the packet. The Sync Fields may include alternating bits, i.e., 10101010, to enable the receiving transceiver to evaluate whether received bits are properly positioned. For example, if the receiver had shifted one bit position out of synchronization, then evaluation of the Sync Fields would enable detection and correction of the error. The final field of the data packet may be a Communication Complete Field, which contains a data code indicating to the transceiver that the complete data packet has been received.

The Communication Type field defines how subsequent fields of the data packet will be interpreted. In particular, the number of fields in the packet may be different depending on the Communication Type field.

In a first example, the Communication Type field defines the number of bits that are used to define the address field in a read or write command. As noted in Table 1, where the Communication Type field is equal to 0x03, a following Command/System Address field has a length of 16 bits. When the Communication Type field is equal to 0x07, a following Command/System Address field has a length of 32 bits. Other values for the Communication Type field may define other lengths for the Command/System Address field.

In some embodiments, the Communication Type field also communicates information to set up and provide feedback regarding a connection between transceivers. For example, a value of 0x01 may indicate that a data packet is a Knock Knock command instructing the receiving transceiver to respond with a packet having a Communication Type field equal to 0x02, which corresponds to an Acknowledge message.

In some embodiments a value of 0x05 indicates that communication between the transceivers has become corrupted and a value of 0x06 indicates that communication has stopped. The definitions for values of the Communication Type field are exemplary and may be assigned arbitrarily.

The Communication ID field identifies the data packet. Upon generating a data packet, the sending transceiver will insert a random string of bits in the Communication ID field. The receiving transceiver will use the same Communication ID in its response. The sending transceiver may then increment the Communication ID and use the incremented value in the next communication. In some embodiments, the value for the initial Communication ID is taken from the transceivers "live data" which refers to measured parameters regarding optical data transmitted from and received by the transceiver, such as output power, received power, temperature, and the like.

The communication identifier used by the requestor can also be used as an encryption seed for a command or response to a communication in addition to public and private keys known to the transmitting and receiving module. For a subsequent command or response the encryption seed may be based on the next random Communication identifier. The random number may be seeded by a byte of the live data, which tends to be random.

Exemplary values for the Command Identifier field are summarized in Table 2. As is apparent in Table 2, the function associated with values of the Command Identifier field is dependent on the value of the Command Type field. The function and number of subsequent fields in the data packet may be dependent on the Command Type and Command Identifier fields.

TABLE 2:

| Communication Type | Command | Description | Fields |
| --- | --- | --- | --- |
| 0x01 | 0x00 | Knock knock | C-ID/Sync/CMD/status/extended status/checksum/communication complete |
| 0x01 | 0x01 | Knock knock | C-ID/Sync/CMD/status/extended status/layer count/layer/checksum/communication complete |
| 0x02 | 0x00 | Acknowledge | C-ID/Sync/CMD/status/extended status/checksum/communication complete |
| 0x02 | 0x01 | Acknowledge | C-ID/Sync/CMD/status/extended status/layer count/layer/checksum/communication complete |
| 0x03 | 0x01 | Read request | C-ID/sync/CMD/system address 16 bits/length/sync/contingency/extended contingency/checksum/communication complete |
| 0x03 | 0x02 | Write request | C-ID/syncICMD/system address 16 bits/length/data bytes/sync/contingency/extended contingency/checksum/communication complete |
| 0x04 | 0x01 | Read response | C-ID/sync/CMD/system address 16 bits/length/data bytes/sync/status/extended status/checksum/communication complete |
| 0x04 | 0x02 | Write response | C-ID/sync/CMD/system address 16 bits/length/sync/status/extended status/checksum/communication complete |
| 0x05 | 0x00 | Sync byte out of place | C-ID/sync/CMD/status/extended status/checksum/communication complete |
| 0x05 | 0x01 | Checksum problem | C-ID/sync/CMD/status/extended status/checksum/communication complete |
| 0x06 | 0x00 | Not receiving out-of-band | C-ID/sync/CMD/status/extended status/checksum/communication complete |
| 0x06 | 0x01 | Not receiving data | C-ID/sync/CMD/status/extended status/checksum/communication complete |
| 0x07 | 0x01 | Read request | C-ID/sync/CMD/system address 32 bits/length/sync contingency/extended contingency/checksum/communication complete |
| 0x07 | 0x02 | Write request | C-ID/sync/CMD/system address 32 bits/length/sync/contingency/extended contingency/checksum/communication complete |
| 0x08 | 0x01 | Read Response | C-ID/sync/CMD/system address 32 bits/length/data bytes/sync/status/extended status/checksum/communication complete |
| 0x08 | 0x02 | Write Response | C-ID/sync/CMD/system address 32 bits/length/sync/status/extended status/checksum/communication complete |

Figure 5:
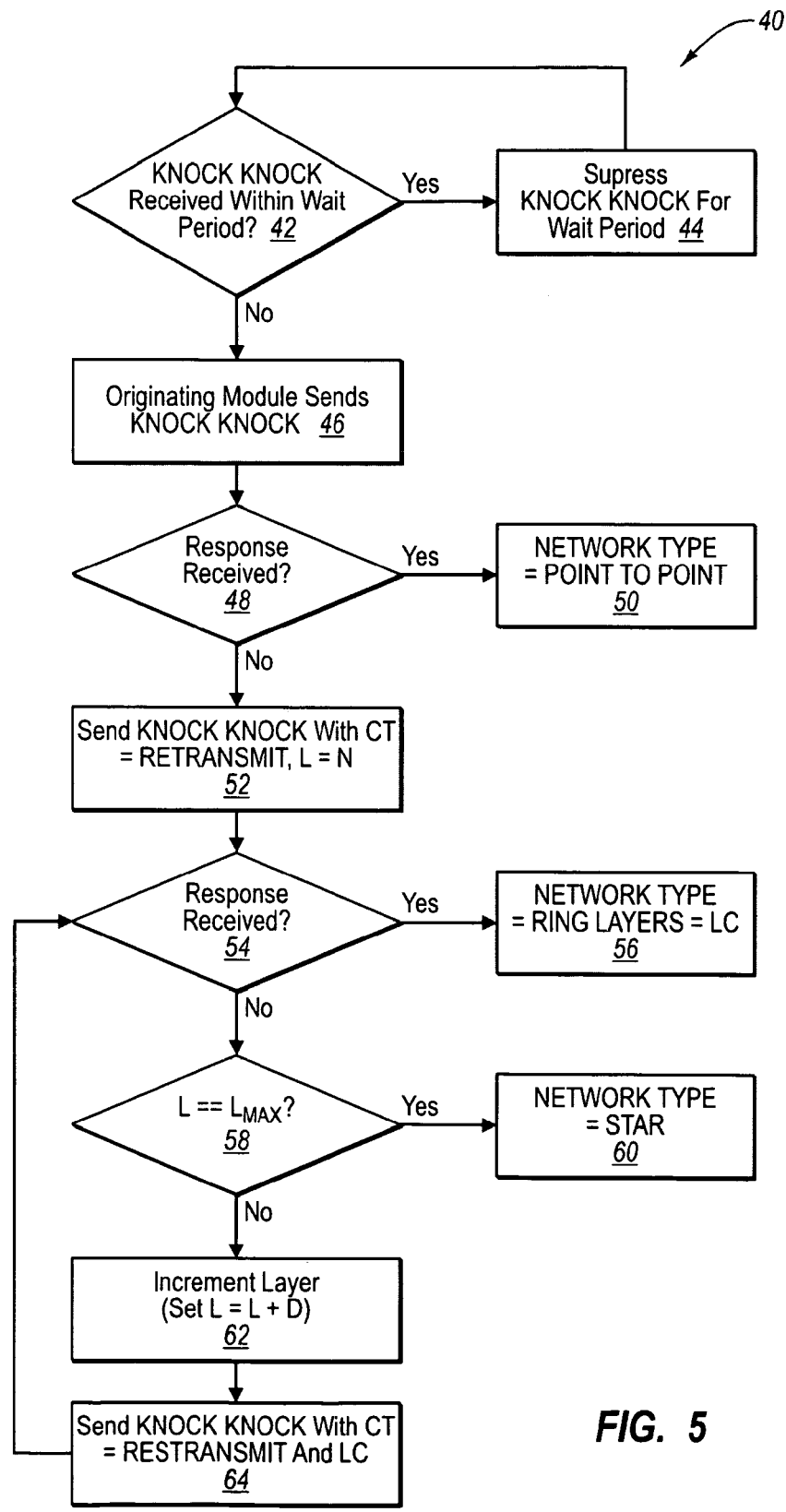
FIG. 5 is a process flow diagram of a method for discovering module connections in accordance with an embodiment of the present invention.

Referring to FIG. 5, a method 40 may be used for initiating communication between a transmitting module and a receiving module. The method 40 may include evaluating whether a Knock Knock message has been received recently at step 42. If so, in order to prevent a storm of Knock Knock messages, the transmitting module may suppress sending of a Knock Knock command for a waiting period at step 44. Step 42 may then be repeated. If at step 42 no Knock Knock message has been received, step 46 may be executed by transmitting a Knock Knock message to the receiving module. Step 46 may include transmitting a Knock Knock message directly to the receiving module without any instruction to pass it on to another module. For the example commands of Table 2, this may be accomplished by transmitting a data packet having CT=0x01 and CMD=0x00.

At step 48, the method 40 includes evaluating at the transmitting module whether a response has been received at the receiving module. A response may include an Acknowledge message including data packet having CT=0x02 and CMD=0x00 as illustrated in Table 2. If a response is received at step 48, then the network type is point-to-point wherein the transmitter and receiver of the transmitting module are coupled to the receiver and transmitter, respectively of the receiving module. Step 50 may therefore include recording this fact within the transmitting module, such as by setting a Network Type variable or setting to a value corresponding to a point-to-point network, such as a value for a layer count of the network equal to 1 or 0 indicating a point to point connection.

If no response is received at step 48, then step 52 is performed, which includes sending a Knock Knock message that instructs the receiving module to retransmit the message. The Knock Knock message may further instruct N subsequent receiving modules to retransmit the message. For example, the transmitting module may transmit a message having CT=0x01 and CMD=0x01. As noted in Table 2, this command includes Layer Count and Layer fields. The Layer field may indicate the number of times that the message is to be re-transmitted. The Layer count may indicate to a receiving module how many times the message has already been retransmitted. The receiving module, and any subsequent receiving module, may then compare the Layer Count to the Layer field, if the layer count is less than the layer field, then the module will increment the layer count and retransmit the message. Step 52 may include setting the Layer field to an initial value N, such as 10, or some other value.

In some embodiments, the Layer Count and Layer field relate to Wrappers, rather than layers. For some communications, a receiving module will generate a data packet, or wrapper, having a received data packet embedded therein, such as in the Data field. In such embodiments, the Layer Count field indicates the number of wrappers in the data packet. In such instances the Layer field indicates the number of wrappers at which the original data packet has reached its destination. In some embodiments, the wrappers may be used to conduct fabric discovery as each intervening module that receives a discovery request adds a wrapper that may include a unique Communication ID, and perhaps other data such as the live data of the intervening module. The final wrapper will therefore contain data from each of the intervening modules. Alternatively, wrappers may consist only in addition of a module identifier or communication ID into the wrapper field. A module forwarding a data packet with a wrapper may also increment the wrapper count field.

Step 54 may include evaluating at the original transmitting module whether a response has been received. The response may include one of the Acknowledge messages outlined in Table 2. A response may be received from a transceiver having its transmit port coupled to the receive port of the original transmitting module.

If a response is received at step 54, then the network is a ring network wherein the transmitter and receiver of the transmitting module are coupled to the receiver and transmitter of different modules, such as is illustrated in FIG. 2. Step 56 may therefore include recording this fact within the transmitting module, such as by setting a Network Type variable or setting to a value corresponding to a ring network. Step 56 may also include noting that the number of layers in the ring network is equal to the value of the Layer field in the Knock Knock message sent in the last iteration of step 52.

If no response has been received at step 54, then step 58 may be performed which includes comparing the value of the layer field from step 52 (or a previous iteration of step 64 described below) to determine whether it exceeds an $L_{MAX}$ value. If it does, then step 60 includes recording within the original transmitting module that the network is a star type.

If the value of the layer field from step 52 (or a previous iteration of step 64 described below) does not equal or exceed the $L_{MAX}$ value, then the layer field is incremented by an increment amount D, such as 1, 5, 10, or some other value at step 62. Inasmuch as a ring networks typically do not have more than twenty layers, $L_{MAX}$ may be equal to 20 in some embodiments. At step 64, another Knock Knock message is transmitted having the Layer field equal to the incremented value calculated at step 62. Step 54 may then be repeated.

Figure 6:
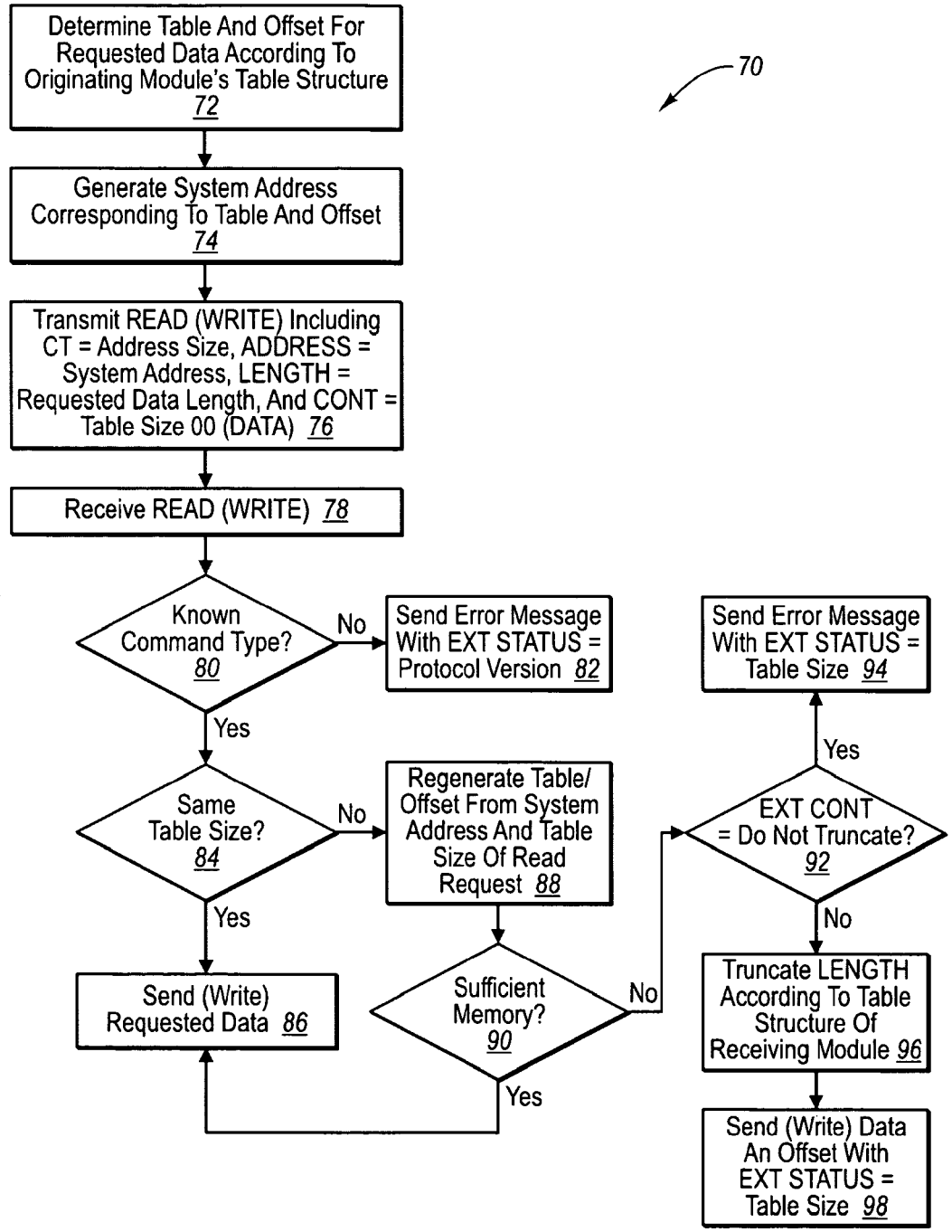
FIG. 6 is a process flow diagram of a method for reading and writing data between dissimilar transceivers in accordance with an embodiment of the present invention.

In many networks, transceiver modules are replaced one at a time as they begin to fail. Accordingly, newer transceivers will often be required to communicate with older transceivers with less functionality. Accordingly, the method 70 of FIG. 6 may be used to accommodate such differences.

In typical transceiver modules, data is accessed with reference to a table number and a position or "offset" within the table corresponding to the table number. The size of each table may vary depending on the amount of memory in the module and the standard or "multi-source agreement" (MSA) with which it complies. As standards develop, the type of data stored in each table may be augmented, but previously defined table locations are maintained the same. Accordingly, as table sizes increase, the initial storage locations in each table may conform to previous standards, whereas subsequent table locations contain other types of data defined by newer standards. Methods in accordance with embodiments of the present invention accommodate such table/offset standards, but are capable of use in the absence of such standards.

In one embodiment, the method 70 includes determining at 72 by a transmitting module the table/offset address of data that the transmitting module intends to write to or request from a receiving module as defined by a standard with which the transmitting programmed has been programmed to comply.

At step 74, the transmitting module translates the table/offset address into a system address. The division of transceiver memory into tables is typically logical and the data is actually stored in random access memory embodied as an undifferentiated array of memory locations 0-N. Accordingly, the table/offset address may be mapped to a specific memory location referred to as a system address. For example, where a transceiver has tables of 256 bytes, table 0/offset 124, may be mapped to system address 124, whereas table 1/offset 124 may be mapped to system address 380.

At step 76, a Read or Write request is transmitted to a receiving module. The request may include data packet having CT=0x03 and CMD=0x01 (16 bit read request), CT=0x03 and CMD=0x02 (16 bit write request), CT=0x07 and CMD=0x01 (32 bit read request), CT=0x07 and CMD=0x02 (32 bit write request) as defined by Table 2. The request may also include some other Read or Write request that define layer and layer count fields in order to address a transceiver other than to which the transmitting receiver is immediately coupled.

A read request preferably includes a Command Type (CT) field that defines the system address length (e.g. 16 or 32 bits). The read request may also indicate the system address calculated at step 74 in the System Address field and the length of requested data in the Length field. In some embodiments of the invention, the read request also stores the table size of the transmitting module in the Status/Contingency field. A write request may additionally include data stored in the Data field to be written in the memory of the receiving module. In a write request, the Length field may refer to the number of bytes included in the Data field, or the number of address locations occupied by the data included in the Data field.

At step 78, the read or write request is received. At step 80, the receiving module evaluates whether it recognizes the Command Type field. Where the receiving module is older than the transmitting module, the Command Type field may not be recognized. If the command type is not recognized, then step 82 may be executed, which include sending an error message, which may be embodied as a data packet having the Extended Status field storing an identifier of the protocol version of the receiving module. On receiving the error message the original transmitting module may transmit subsequent Read and Write requests that conform to the protocol indicated in the error message.

If the command type is recognized, then step 84 may be executed, which includes determining whether the table size stored in the Status/Contingency field of the read or write request is the same as that of the receiving module. If they are the same, then the method 70 may include sending the data stored at the system address of the receiving module indicated in a read request or writing data to the system address indicated in a write request at step 86.

If the table sizes are not the same, then at step 88 the system address of the read or write request may be translated into a table and offset of the transmitting module using the table size stored in the Contingency field of the read or write request. At step 90, the receiving module evaluates whether it has sufficient memory to read or write the amount of data specified in the Length field beginning at the table/offset determined at step 88. If it does, then the requested data may be transmitted to the transmitting module or written to the memory of the receiving module at step 86.

If the receiving module is found not to have sufficient memory, then the Extended Contingency field of the read or write request may be examined at step 92. If the Extended Contingency field contains a value instructing the receiving module not to truncate its response, then an error message is sent at step 94 with an Extended Status field storing the table size of the receiving module. If the Extended Contingency field does not instruct the receiving module not to truncate its response, then the value of the Length field of the read or write request is truncated at step 96 and the truncated amount of data is either transmitted to the original transmitting module or written to the receiving module at step 98 according to the table/offset calculated at step 88. Step 98 may include transmitting a Write Response or Read Response (see Table 2) having an Extended Status field storing the table size of the receiving module. In some embodiments, where the receiving module has a larger memory or at least a larger table size, the receiving module will analyze the table size in a received read or write request and transmit only data in tables up to the table size of the transmitting module to the receiving module. For example, if the transmitting module has a table size of 128 and the receiving module has a table size of 256, then the receiving module may respond to a request for data in table 1, for example, by sending only 128 bytes of data therefrom.

Figure 7:
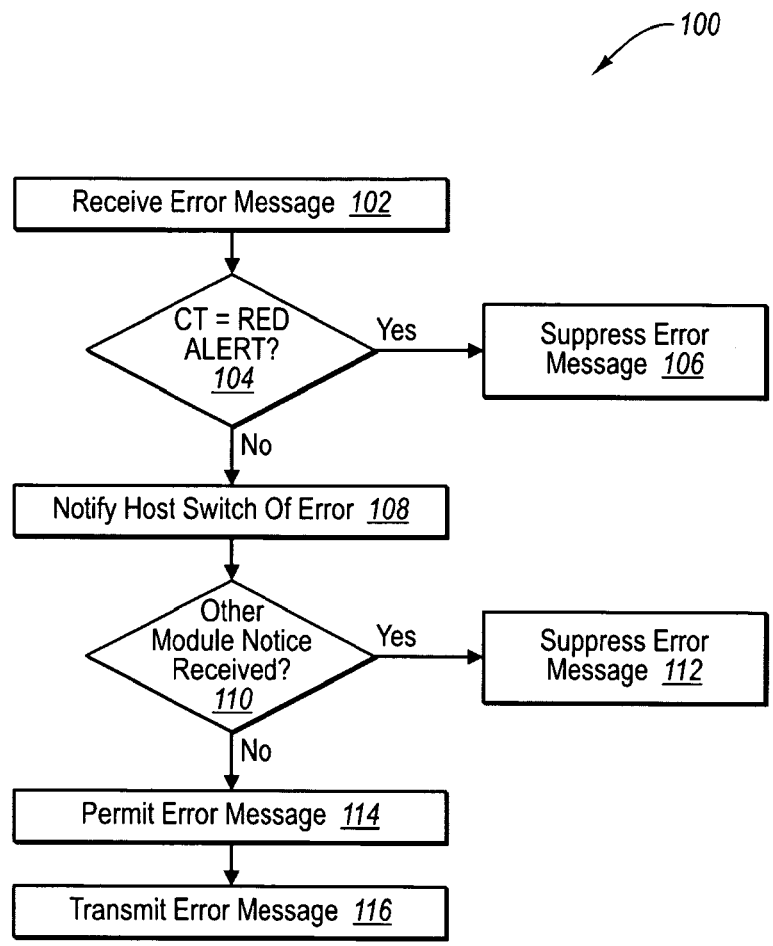
FIG. 7 is a process flow diagram of a method for suppressing error message traffic in accordance with an embodiment of the present invention.

Referring to FIG. 7, in some embodiments a network device 12a-12b may cooperate with a plurality of transceiver modules 14a-14b coupled thereto to control the amount of out-of-band data transmitted across the network fabric according to a method 100. At step 102 a first transceiver module receives an error message from another transceiver module in the fabric. At step 104, the first transceiver module examines the Command Type field of the error message. If the Command Type is a value corresponding to a high priority error, designated here as RED ALERT, then the first transceiver module suppresses any error messages for a wait period at step 106.

If the error message is found not to be a RED ALERT, then the first transceiver module notifies the host network device to which it is immediately coupled that it has an error message to transmit at step 108. At step 110, the host network device evaluates whether other transceiver modules to which it is immediately coupled have provided notice of pending error messages. If so, then the host network device instructs the first transceiver module to suppress the error message at step 112 for a wait period. If not, then the host network device instructs the first transceiver module to transmit the error message at step 114. The first transceiver module then transmits the error message at step 116.

Figure 8:
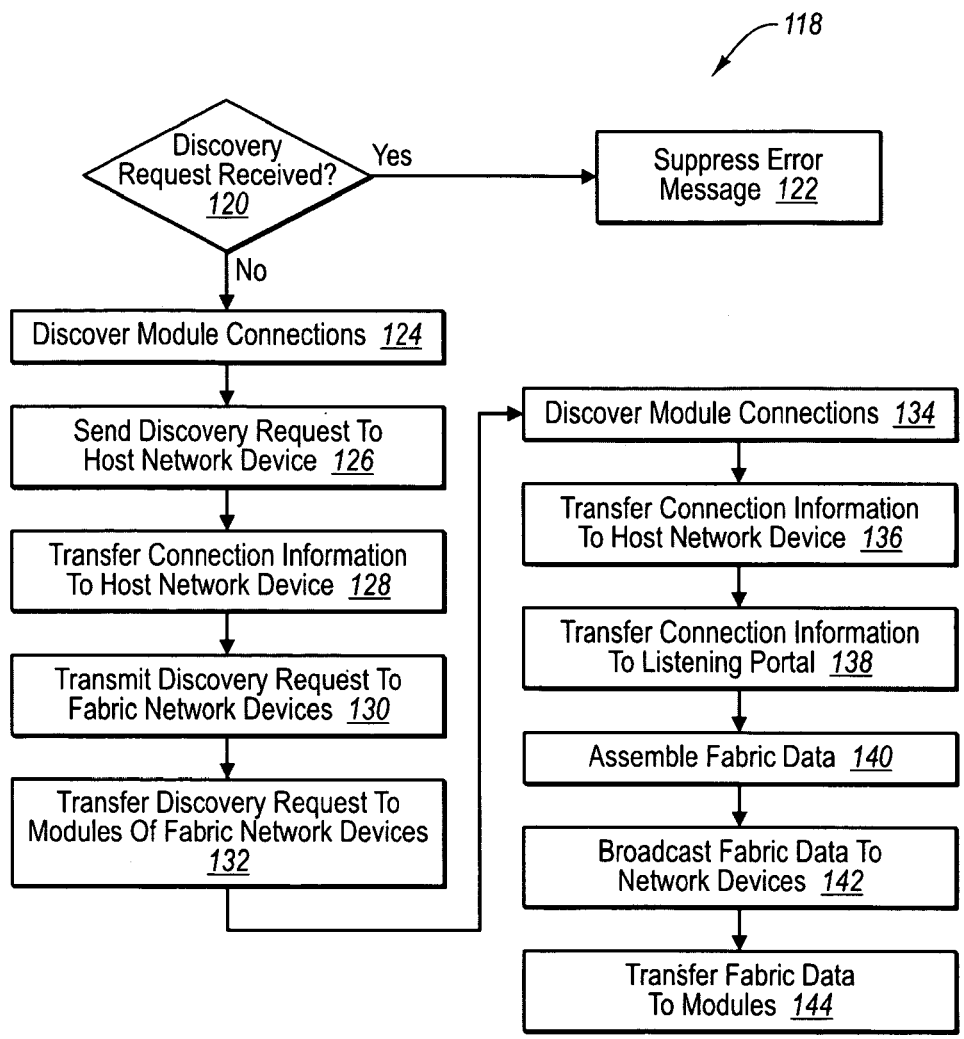
FIG. 8 is a process flow diagram of a method for discovering a network configuration in accordance with an embodiment of the present invention.

Referring to FIG. 8, while referring again to FIG. 4, the host network devices 12a-12f may facilitate discovery of the fabric layout according to a method 118 in order to facilitate out-of-band communication between transceiver modules 14a-14c of different layers. In some embodiments, one of the network devices, such as network device 12a may be designated a listening portal to which fabric layout information will be transmitted.

The method 118 may include evaluating at step 120 at an individual transceiver module whether a discovery request has been received from another transceiver module. If so, then the individual transceiver module may suppress discovery requests indefinitely, or for a wait period, at step 122 in order to avoid generating undue chatter. If a discovery request has not been received, then at step 124, the individual transceiver module will discover modules to which it is connected. Step 124 may include sending Knock Knock messages according to the method of FIG. 5. The individual transceiver module may then evaluate responses to determine which transceiver modules it is connected to. Step 124 may include sending a message instructing other modules to add a wrapper and/or other data to the message and retransmit, such that when a response circulates back to the individual transceiver module over a ring network, for example, it will contain data regarding all intervening modules. Step 124 may include discovery conducted without involvement of any network devices hosting the modules.

At step 126, the individual transceiver module transmits a discovery request to the network device to which it is immediately coupled. At step 128, the individual transceiver module also transmits connection information determined at step 124 to its host network device. At step 130, the host network device transmits a fabric discovery request to other network devices. The request may be transmitted in-band rather than out-of-band. Upon receiving the discovery requests, the other network devices may transmit discovery requests to transceiver modules that they host at step 132. In response to step 132, the transceiver modules will discover out-of-band module connections at step 134, such as by sending Knock Knock messages according to the method of FIG. 5 or as described with respect to step 124 and evaluating responses to determine which transceiver modules it is connected to.

At step 136, the transceiver modules of steps 132 and 134 will transmit the connection information from step 134 to the host network device to which they are immediately coupled. At step 138, the network devices transmit the connection information collected at step 136 to the listening portal. At step 140, the listening portal assembles the information transmitted from the network devices during step 138 into a description of the network fabric. At step 142, the listening portal broadcasts the fabric description to the network devices. Step 142 may include transmitting the data in-band rather than out-of-band. At step 144, each network device may transfer all or part of the fabric description to transceiver modules that it hosts.

Figure 9:
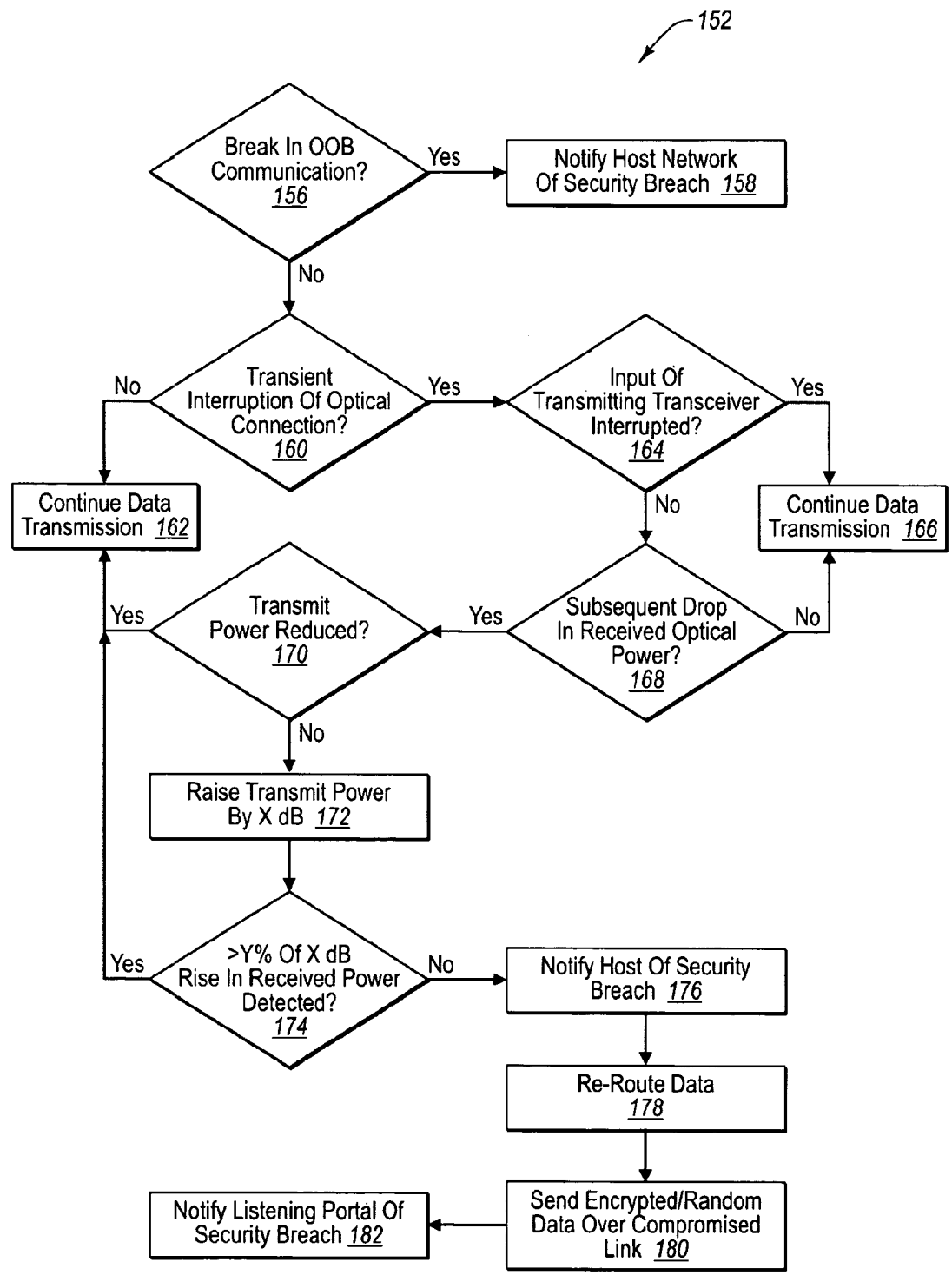
FIG. 9 is a process flow diagram of a method for detecting network intrusions in accordance with an embodiment of the present invention.

Referring to FIG. 9, while also referring to FIG. 4, in some embodiments, communication in an OOB channel 24 may be used to detect unauthorized intrusion in a network. For example, a tap may be placed on an optical link 150 between transceiver module 14c of layer 2 hosted by network device 12c and the transceiver module 14b of layer 3 hosted by network device 12g. Alternatively, one of the modules 14c and 14b coupled to link 150 may be replaced by an unauthorized transceiver.

Accordingly, the method 152 of FIG. 9 may be used to detect the intrusion and reroute data, such as over link 154 between module 14a of layer 2 hosted by network device 12c and module 14b of layer 3 hosted by network device 12e.

At step 156, the method 152 includes evaluating whether a break in communication in the OOB channel has occurred. If so, then one or both of the modules 14c and 14b coupled to link 150 will notify the listening portal 12a of the breach at step 158. Notification may include providing notice to one or both of the network devices 12c and 12g of the breach, which may then provide notice to the listening portal 12a either through the data channel 22 or the OOB channel through one of the other modules hosted by the network devices 12c and 12g.

At step 160, the method includes evaluating whether a transient interruption in the optical connection between a transmitting module and a receiving module has occurred. If not, communication of data continues at step 162. If so, then step 164 includes evaluating whether an input to the transmitting module was interrupted. If so, then transmission continues at step 166. If not, then step 168 includes evaluating whether a drop in received optical power followed the transient interruption. If not, then transmission continues at step 166. If so, then step 170 includes evaluating whether the transmitting module has reduced its transmit power, such as by inquiring over the OOB channel 24 whether a drop has occurred. If so, then transmission of data continues at step 162. If not, then step 172 includes the transmitting module raising its output power by X decibels. At step 174, the receiving module evaluates whether more than Y % of the X decibel increase has been detected. The transmitting module may communicate the value of X to the receiving module by means of the OOB channel 24. The value of Y may be 90, 80, or some other value. If more than Y % of the X decibel increase is detected, than at step 162, data transmission continues. If not, then at step 176, the receiving module notifies its host network device that a security breach has occurred. At step 178, the network device hosting the receiving module takes steps necessary to route data through an alternate link. For example, if link 150 is found to be compromised, data may be routed through link 154 instead. At step 180, the transmitting and receiving module may begin to either encrypt data communicated therebetween or send random data. At step 182 a listening portal may be notified of the security breach by one or both of the network devices hosting the transmitting and receiving modules.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A transceiver module comprising:
a transmitter configured to transmit a first command, including a data packet command instructing a receiving transceiver to respond with a packet which corresponds to an acknowledge message;
a receiver configured to receive responses from the receiving transceiver;
a memory and a processor configured to record on the memory an indicator that the transceiver module is in a point-to-point network upon the receiver receiving a response corresponding to the first command from the receiving transceiver;
the transmitter further configured to transmit one or more subsequent commands upon the receiver failing to receive the response corresponding to the first command from the receiving transceiver, wherein each of the one or more subsequent commands includes instructions to the receiving transceiver to retransmit the acknowledge message;
the processor further configured to record on the memory an indicator that the transceiver module is in a ring network upon the receiver receiving a response corresponding to the one or more subsequent commands from the receiving transceiver, the response corresponding to the one or more subsequent commands including wrappers generated by a plurality of transceiver modules of the ring network; and
the processor further configured to record on the memory recording an indicator that the transceiver module is not in a point-to-point network or a ring network upon the receiver failing to receive the response corresponding to the first command from the receiving transceiver and the receiver failing to receive a response corresponding to the one or more subsequent commands from the receiving transceiver.

2. The transceiver module of claim 1, wherein the processor is further configured to record on the memory an indicator that the transceiver module is in a star network upon the receiver failing to receive the response corresponding to the first command from the receiving transceiver and the receiver failing to receive the response corresponding to the one or more subsequent commands from the receiving transceiver.

3. The transceiver module of claim 1, wherein each of the one or more subsequent commands further includes a layer count field, the layer count field configured to indicate a number of times the commands have been retransmitted.

4. The transceiver module of claim 1, wherein the processor is further configured to record on the memory a number of transceiver modules associated with the ring network upon the receiver receiving the response corresponding to the one or more subsequent commands.

5. The transceiver module of claim 1, wherein the instructions to retransmit the acknowledge message include instructions to retransmit the acknowledge message L number of times, wherein L is a positive integer.

6. The transceiver module of claim 5, wherein L is increased by an incremental value upon failure to receive a response corresponding to the first command or the one or more subsequent commands.

7. The transceiver module of claim 1, wherein:
the transmitter is further configured to transmit a second command associated with the one or more subsequent commands upon the receiver failing to receive a response corresponding to the first command from the receiving transceiver, wherein the second command includes instructions to forward the second command L number of times, wherein L is a positive integer;
the processor is further configured to compare the value of L to a maximum value; and
the transmitter is further configured to transmit a third command associated with the one or more subsequent commands upon the receiver failing to receive a response corresponding to the second command from the receiving transceiver and the processor determining that L is below the maximum value, wherein the third command includes instructions to forward the third command L' number of times, wherein L' is equal to L having been increased by an incremental value.

8. The transceiver module of claim 7, wherein:
the transmitter is further configured to transmit additional commands associated with the one or more subsequent commands, each additional command transmitted upon all of:
the receiver failing to receive a response corresponding to a previous command;
the processor determining that the value of L does not exceed the maximum value; and
L being increased by the incremental value to equal L'.

9. The transceiver module of claim 1, wherein the plurality of transceiver modules are hosted by network devices.

10. The transceiver module of claim 9, wherein each of the network devices is at least one of a host bus adapter, switch, router, and computer.

11. The transceiver module of claim 1, wherein the first command and the one or more subsequent commands are communicated in an out-of-band optical channel.

12. The transceiver module of claim 11, wherein the out-of-band optical channel comprises modulation of a power envelope of optical signals in an in-band optical channel.

13. A method for discovering a network fabric including a plurality of transceiver modules, the method comprising:
transmitting a first knock knock command from a first transceiver module of the plurality of transceiver modules;
evaluating whether the first transceiver module receives a response corresponding to the first knock knock command;
if the first transceiver module receives the response corresponding to the first knock knock command, then recording an indicator that the first transceiver module is in a point-to-point network; and
if the first transceiver module does not receive the response corresponding to the first knock knock command, then transmitting one or more subsequent knock knock commands including:
transmitting a subsequent knock knock command including instructions to forward the subsequent knock knock command L times, wherein L is a positive integer;
if the first transceiver module receives a response corresponding to the subsequent knock knock command that includes wrappers generated by others of the plurality of transceiver modules, then recording an indicator that the first transceiver module is in a ring network;
if the first transceiver module does not receive a response corresponding to the subsequent knock knock command, then determining if L is less than a maximum value;
if L is not less than the maximum value, then recording an indicator that the first transceiver module is in a star network; and
if L is less than the maximum value, then incrementing L and repeating the transmitting of the one or more subsequent knock knock commands.

14. The method of claim 13, wherein the plurality of transceiver modules are hosted by network devices.

15. The method of claim 14, wherein each of the network devices is at least one of a host bus adapter, switch, router, and computer.

16. The method of claim 13, further comprising communicating the first knock knock command and the one or more subsequent knock knock commands in an out-of-band optical channel.

17. The method of claim 16, wherein the out-of-band optical channel comprises modulation of a power envelope of optical signals in an in-band optical channel.

18. The method of claim 13, wherein recording the indicator that the first transceiver module is in a ring network includes recording a number of layers in the ring network, the number of layers being equal to L.

19. The method of claim 13, wherein incrementing L includes increasing L by an increment value.

* * * * *

UNITED STATES PATENT AND TRADEMARK OFFICE
CERTIFICATE OF CORRECTION

PATENT NO. : 8,798,457 B2  
APPLICATION NO. : 13/356403  
DATED : August 5, 2014  
INVENTOR(S) : Noble Page 1 of 1

It is certified that error appears in the above-identified patent and that said Letters Patent is hereby corrected as shown below:

On the Title Page, delete "(60)" and insert -- (62) --, therefor.

In the Specification

In Column 5, Line 8, delete "receive port 26" and insert -- receive port 28 --, therefor.

In Column 5, Line 39, delete "module data 24" and insert -- module data 20 --, therefor.

In Column 5, Line 51, below Table 2, insert -- Command Descriptions --.

Signed and Sealed this  
Third Day of March, 2015

Michelle K. Lee  
*Deputy Director of the United States Patent and Trademark Office*